Patented Nov. 21, 1933

1,936,074

UNITED STATES PATENT OFFICE 1,936,074

PREPARATION OF FOOD PRODUCTS

Donald K. Tressler and William T. Murray, Gloucester, Mass., assignors to Frosted Foods Company, Inc., Dover, Del., a corporation of Delaware No Drawing. Application July 30, 1930
Serial No. 471,890

11 Claims. (Cl. 99—11)

This invention relates to the preparation of food products for distribution and consumption. It comprises a novel method of conserving the moisture content of meat products. By the term meat products we mean all animal meat and flesh, including the meat of fish and other sea-foods.

Our invention is particularly concerned with the problem of conserving the moisture content of meat products against loss by leakage. By the discovery upon which our invention rests, we are enabled to prevent or greatly reduce this objectionable loss of moisture content from such meat products.

It is well known that many meat products, as above defined, are subject to leakage or seepage of the meat juices, especially from cut surfaces. This loss may occur whenever meat is left standing for even a short time. Such loss of moisture content occurs also from meat products which have been frozen and then thawed. Leakage may also occur in the case of frozen meat products during the freezing operation and substantially up to the time when the moisture is sufficiently chilled to become congealed. Such leakage is objectionable on account of its drying out effect upon the product, and because the moisture content carries with it various soluble constituents of the meat, the loss of which impairs its flavor and food value.

We have discovered that this objectionable leakage may be greatly reduced by treating meat products with a suitable enzyme, as for example by dipping the raw meat in a dilute solution of a proteolytic enzyme. We have found that a meat product suitably treated in this manner is subject to a comparatively slight amount of moisture loss as compared with the loss from an untreated product under the same conditions. Moreover, this desirable result persists when the treated meat product is frozen and thawed. Our invention, therefore, comprises broadly a method of conserving the moisture content of a meat product by treating the product with a suitable enzyme, and in another aspect it comprises a method of improving frozen meat products by treating the product with a suitable enzyme prior to the freezing step. It will be understood, of course, that meat products contain naturally some enzymes, and that what is contemplated by our invention is increasing such natural enzyme content.

It may be stated that the application of an enzyme to the surface of a meat product, in accordance with our invention, promotes the formation of a colloidal jell in the protein cell contents of the surface layers thereof and this jell retards leakage from the product. The treatment is of especial importance and value in connection with meats which are to be frozen, since the freezing of meat normally causes a coagulation resulting in a separation of the solid and liquid components of the cell contents, and the liquids thus released tend to leak out when the meat is defrosted. The formation of the jell prior to freezing prevents this separation of the solids and liquids by partially stabilizing the liquids, and the usual leakage loss upon defrosting is thereby materially reduced.

The features and advantages of our invention will be best understood and appreciated from the following description of some specific applications thereof.

For example, in the case of a five-pound sirloin roast, we have obtained good results by the following procedure. The freshly cut roast is dipped in a 0.1% solution of the proteolytic enzyme trypsin (U. S. P.) at a normal temperature of approximately 15° C., for a period of about thirty seconds. The roast is then removed from the bath and permitted to drain. The subsequent leakage from a roast thus treated will be materially less than would otherwise result.

A roast thus treated may, if desired, be wrapped in a moisture-proof envelope and frozen in a refrigerating apparatus such as that disclosed in U. S. Letters Patent No. 1,773,081 to Clarence Birdseye. When such a roast has been thawed, the subsequent leakage from the roast will be materially less than would otherwise result, precisely as in the case of the unfrozen roast.

Also, as an example of the application of our invention to fish products, in preparing fresh haddock fillets for distribution and consumption we have obtained satisfactory results from the following procedure. The fresh fillets as cut from the fish are dipped in an enzyme solution of a concentration between 0.05% and 0.25%, at a normal temperature of about 15° C., for a period varying from fifteen seconds to two minutes, depending upon the concentration of the solution and the particular enzyme chosen. In using trypsin, for example, the fish fillets may be dipped for a period of about twenty seconds in a 0.05% solution of trypsin (U. S. P.). It has been found that with fillets thus treated the leakage will be substantially eliminated.

Fillets thus treated may be immediately wrapped in a moisture-proof covering such as a regenerated cellulose in sheet form, packed in cartons and frozen therein, as in a refrigerating apparatus such as that disclosed in U. S. Letters Patent No. 1,773,081 to Clarence Birdseye. Such frozen fillets, upon thawing, will leak materially less than they otherwise would.

The effectiveness of the method of our invention in preventing leakage in frozen meats is equally noteworthy whether the meat is slow frozen or quick frozen.

We have illustrated the use of our invention as carried out by dipping the meat product in an enzyme solution but meat products may be subjected to our enzyme treatment by other means, as by injecting the enzyme solution into the interior of the product, or into the veins as of an animal product, or by applying the enzyme to the product in the form of a powder or dry mixture.

While we have given examples of treatment which we have found useful and effective, it should be understood that they are merely examples and our invention is not limited to any particular character or quantity of enzymes—the invention residing broadly in the use of a proteolytic enzyme which will stabilize the moisture content.

It would be difficult or impossible to specify all the enzymes which could be used in the practice of our invention. Suitable enzymes are derived from various sources and are readily prepared in concentrated form by known methods. The activity of various enzymes differs, and since the proportion or quantity to be used depends upon their activity, such proportion or quantity, together with the length of treatment, as in the case of dipping in a solution, can be specified only in particular cases, being, however, readily determined by test in each case.

For instance, pancreatin, pepsin and rennin will also effectively reduce leakage. Pepsin should preferably be used in a somewhat greater concentration than trypsin or pancreatin. With rennin, a still greater concentration is desirable to effectively reduce or prevent leakage. It will be recognized that the character of the enzyme and the degree of concentration may be varied to meet the requirements of the particular case.

Having thus described our invention, what we claim as new and desire to secure by Letters Patent is:

1. The method of conserving the moisture content of meat products which consists in subjecting the surface portion of the product to the action of a proteolytic enzyme for a relatively short period of time.

2. The method of conserving the moisture content of meat products which consists in subjecting the surface portion of the product to the action of a dilute solution of a proteolytic enzyme for a relatively short period of time.

3. The method of conserving the moisture content of meat products which consists in subjecting the surface portion of the product to the action of trypsin for a relatively short period of time.

4. The method of conserving the moisture content of meat products which consists in subjecting the surface portion of the product to the action of a proteolytic enzyme solution of a concentration between 0.01% and 0.25% for a relatively short period of time.

5. The method of conserving the moisture content of meat products which consists in subjecting the surface portion of the product to the action of pancreatin for a relatively short period of time.

6. The method of conserving the moisture content to meat products which consists in subjecting the surface portion of the product to the action of pepsin for a relatively short period of time.

7. The method of conserving the moisture content of frozen meat products which consists in subjecting the surface portion of the product to the action of a proteolytic enzyme for a relatively short period of time while the product is unfrozen and prior to the freezing step.

8. The method of conserving the moisture content of frozen meat products which consists in subjecting the surface thereof to the action of trypsin for a relatively short interval while the product is unfrozen and prior to the freezing step.

9. The method of conserving the moisture content of frozen meat products which consists in subjecting the surface of the product for a limited interval of time to the action of one of the enzymes of the group, trypsin, pancreatin, pepsin, or rennin while the product is unfrozen and prior to the freezing step.

10. A frozen meat product in which the moisture content is so substantially stabilized by the presence of an enzyme produced colloidal jell in the protein cell contents of its surface layers that leakage is retarded when the product is thawed.

11. The method of conserving the moisture content of frozen meat products which consists in promoting the formation of colloidal jell in the protein cell contents of the surface layers of the product prior to the freezing step by dipping the unfrozen meat in a dilute solution of proteolytic enzyme, the enzymic action being subsequently arrested by a succeeding freezing step.

DONALD K. TRESSLER.
WILLIAM T. MURRAY.